US011035477B2

(12) United States Patent
Parsons et al.

(10) Patent No.: US 11,035,477 B2
(45) Date of Patent: Jun. 15, 2021

(54) KNIFE GATE VALVE LINER

(71) Applicant: Emerson Vulcan Holding LLC, St. Louis, MO (US)

(72) Inventors: Darren Parsons, Cambewarra (AU); John Sidney Moreland, North Nowra (AU)

(73) Assignee: Emerson Vulcan Holding LLC, St. Louis, MO (US)

( * ) Notice: Subject to any disclaimer, the term of this patent is extended or adjusted under 35 U.S.C. 154(b) by 0 days.

(21) Appl. No.: 16/885,906

(22) Filed: May 28, 2020

(65) Prior Publication Data

US 2020/0292085 A1 Sep. 17, 2020

Related U.S. Application Data

(62) Division of application No. 16/210,880, filed on Dec. 5, 2018, now Pat. No. 10,746,306, which is a division of application No. 15/171,918, filed on Jun. 2, 2016, now abandoned.

(60) Provisional application No. 62/170,602, filed on Jun. 3, 2015, provisional application No. 62/190,099, filed on Jul. 8, 2015.

(51) Int. Cl.
*F16K 3/02* (2006.01)
*F16K 27/04* (2006.01)

(52) U.S. Cl.
CPC .......... *F16K 3/0227* (2013.01); *F16K 3/0263* (2013.01); *F16K 3/0281* (2013.01); *F16K 27/044* (2013.01)

(58) Field of Classification Search
CPC .... F16K 3/0263; F16K 3/0227; F16K 27/044; F16K 3/0281
USPC .................................................. 251/326–329
See application file for complete search history.

(56) References Cited

U.S. PATENT DOCUMENTS

| | | | |
|---|---|---|---|
| 2,857,129 | A | 10/1958 | Overholser et al. |
| 2,942,841 | A | 6/1960 | Stillwagon |
| 3,993,092 | A | 11/1976 | Still |
| 4,009,727 | A | 3/1977 | Bailey |
| 4,026,517 | A | 5/1977 | Still |

(Continued)

FOREIGN PATENT DOCUMENTS

AU 2014271246 A1 1/2015

OTHER PUBLICATIONS https://www.slideshare.net/anupshah76/newcon-general-productsheet, published Jul. 17, 2013 (Year: 2013).*

(Continued)

*Primary Examiner* — Michael R Reid
(74) *Attorney, Agent, or Firm* — Quarles & Brady LLP

(57) ABSTRACT

Embodiments of the invention provide a housing assembly for a knife gate valve. The housing assembly includes a valve body defining a passageway and having a first body and a second body, and a one-piece liner arranged between the first body and the second body. The first body and the second body each include a flange recessed portion that defines a flange recess surface. Each of the flange recess surfaces includes a first flange surface portion, a second flange surface portion, and a raised flange bead. The one-piece liner includes a first liner flange portion that forms a first liner recess. The first liner recess receives the flange recessed portion of the first body to bring the raised flange bead of the first body into engagement with the first liner flanged portion.

20 Claims, 10 Drawing Sheets

(56) References Cited

U.S. PATENT DOCUMENTS

| | | | |
|---|---|---|---|
| 4,051,862 | A | 10/1977 | Haytayan |
| 4,051,863 | A | 10/1977 | Still |
| 4,112,969 | A | 9/1978 | Still |
| 4,377,274 | A | 3/1983 | Mayhew, Jr. |
| 4,646,407 | A | 3/1987 | Mayhew, Jr. |
| 4,881,719 | A | 11/1989 | Bowman |
| 4,951,919 | A | 8/1990 | Haglund et al. |
| 5,141,361 | A | 8/1992 | Fontaine |
| 5,197,512 | A | 3/1993 | Lev |
| 5,205,317 | A | 4/1993 | Neuerberg et al. |
| 5,330,158 | A | 7/1994 | Ellich et al. |
| 5,549,278 | A | 8/1996 | Sidler |
| 5,979,874 | A | 11/1999 | Gambetta et al. |
| 7,100,893 | B2 | 9/2006 | Williams et al. |
| 7,815,170 | B2 | 10/2010 | Devine, Jr. et al. |
| 2005/0285071 | A1 | 12/2005 | Williams et al. |
| 2014/0332707 | A1 | 11/2014 | Reilly et al. |

OTHER PUBLICATIONS

NewCon Co., Your final knife gate valve solution product sheet, undated, 2 pages, Jul. 17, 2013 date.

Newcon Knife Gate Valve for Slurry Application, product sheet, dated Mar. 29, 2020, 8 pages, <www.slidehsare.net/anupshah76/newcon-general-productsheet>.

* cited by examiner

KNIFE GATE VALVE LINER

RELATED APPLICATIONS

This application is a divisional of co-pending U.S. patent application Ser. No. 16/210,880, filed on Dec. 5, 2018, which is a divisional of U.S. patent application Ser. No. 15/171,918, filed on Jun. 2, 2016, which claims priority under 35 U.S.C. § 119 to U.S. Provisional Patent Application No. 62/170,602 filed on Jun. 3, 2015, and to U.S. Provisional Patent Application No. 62/190,099 filed on Jul. 8, 2015, the entire contents of which are incorporated herein by reference.

BACKGROUND

Gate valves or knife gate valves are used to control the flow of fluid, such as process fluid, in a pipeline. These valves include a housing having a fluid passageway and a moveable gate for opening or closing the fluid passageway. The gate is configured to slide within a liner located within the housing. In an open position, the gate is moved to allow flow through the fluid passageway between inlet and outlet ports of the valve. In a closed position, the gate is moved to close the fluid passageway and inhibit flow. The liner is usually one-piece and completely lines the inside of the valve. One-piece liners prevent the metal portion of the valve body from wearing through. For “cast in place” liners, once these liners wear out, the valve is usually thrown away.

SUMMARY OF THE INVENTION

Some embodiments of the invention provide a housing assembly for a knife gate valve. The housing assembly includes a valve body assembly that defines a passageway having an axis and having a first body and a second body, each having a flange recessed portion that extends toward the axis and defines a flange recess surface that is recessed axially relative to a flange surface. Each of the flange recess surfaces includes a first flange surface portion, a second flange surface portion, and a raised flange bead arranged between the first flange surface portion and the second flange surface portion. The first flange surface portion and the second flange surface portion being coplanar and extending in a direction that is transverse to the axis. The housing assembly further includes a one-piece liner arranged between the first body and the second body and having a first liner flanged portion that forms a first liner recess and a second liner flanged portion that forms a second liner flanged portion. The first liner recess receives the flange recessed portion of the first body so that the first liner flanged portion extends around the flange recessed portion of the first body to bring the raised flange bead of the first body into engagement with the first liner flanged portion. The second liner recess receives the flange recessed portion of the second body so that the second liner flanged portion extends around the flange recessed portion of the second body to bring the raised flange bead of the second body into engagement with the second liner flanged portion.

Some embodiments of the invention provide a housing assembly for a knife gate valve. The housing assembly includes a valve body assembly that defines a passageway having an axis and having a first body and a second body, each of the first body and the second body includes a flange surface and a flange recessed portion that protrudes radially inward relative to the flange surface. Each flange recess portion includes a first flange surface portion, a second flange surface portion, and a raised flange bead arranged between the first flange surface portion and the second flange surface portion. The housing assembly further includes a one-piece liner arranged between the first body and the second body and defining a gate slot. The one-piece liner includes a first liner bore surface, a first liner flange, a second liner bore, and a second liner flange. The gate slot extends along a first gate surface in engagement with the first body and a second gate surface in engagement with the second body. The first liner bore surface extends axially away from the first gate surface and the first liner flange extends from the first liner bore surface radially away from the axis, opposite the first gate surface, to define a first liner recess that receives the flange recessed portion of the first body to bring the first liner flange into engagement with the raised flange bead of the first body. The second liner bore surface extends axially away from the second gate surface and the second liner flange extends from the second liner bore surface radially away from the axis, opposite the second gate surface, to define a second liner recess that receives the flange recessed portion of the second body to bring the first liner flange into engagement with the raised flange bead of the second body.

Some embodiments of the invention provide a housing assembly for a knife gate valve. The housing assembly includes a valve body assembly that defines a passageway having an axis and having a first body and a second body each having a flange recessed portion that extends toward the axis and that defines a flange recess surface that is recessed axially relative to a flange surface. Each flange recess surface includes a first flange surface portion, a second flange surface portion, and a raised flange bead arranged between the first flange surface portion and the second flange surface portion. The housing assembly further includes a one-piece liner arranged between the first body and the second body and including a first liner bore surface, a first liner flange, a second liner bore surface, and a second liner flange. The first liner flange extends at least partially along and in engagement with the first flange surface portion, the raised flange bead, and the second flange surface portion of the first body. a radial gap is formed between a distal end of the first liner flange and a radially-inner edge of the flange surface of the first body. The second liner flange extends at least partially along and in engagement with the first flange surface portion, the raised flange bead, and the second flange surface portion of the second body. A radial gap is formed between a distal end of the second liner flange and a radially-inner edge of the flange surface of the second body.

DETAILED DESCRIPTION OF THE INVENTION

Figure 1:
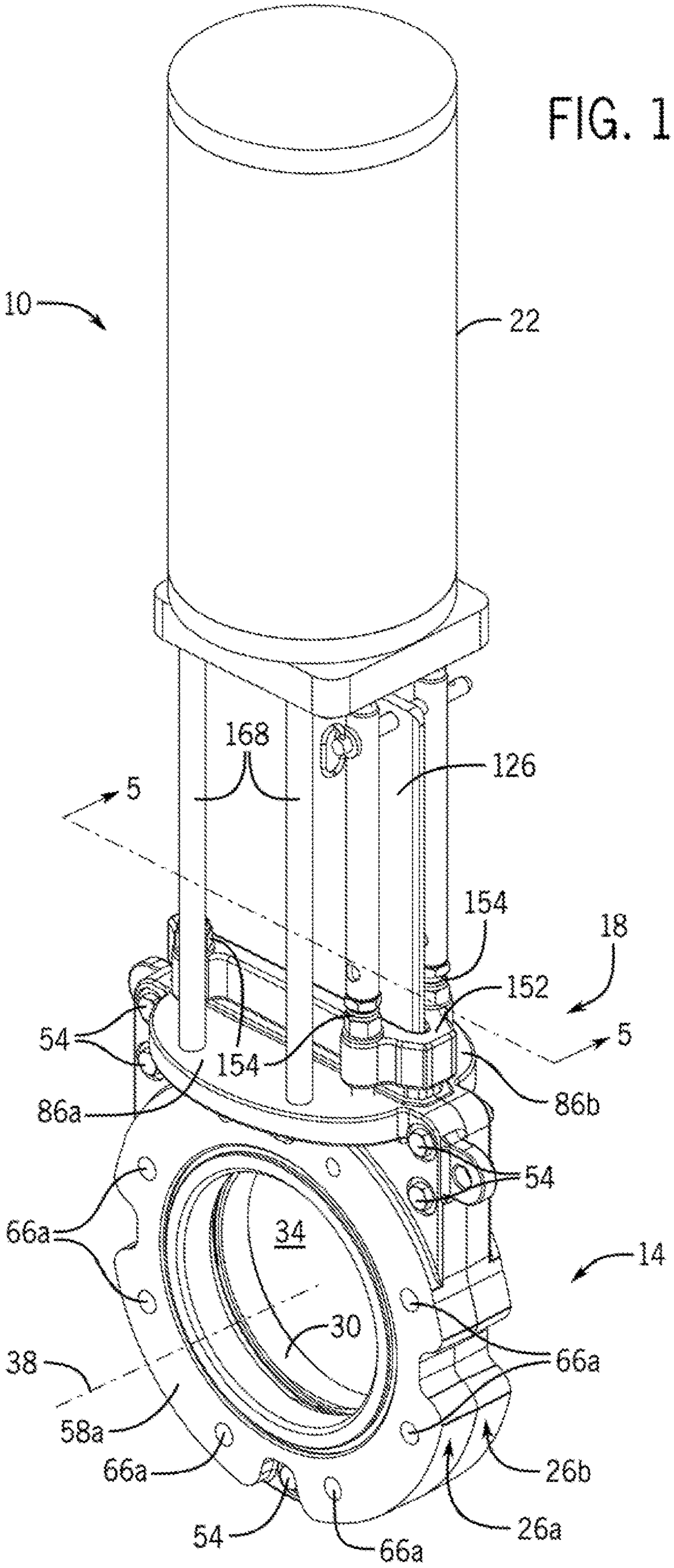
FIG. 1 is a perspective view of a knife gate valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a knife gate valve 10 according to one embodiment of the invention. The knife gate valve 10 includes a valve body assembly 14, a gland assembly 18 and a gate actuation mechanism 22. The valve body assembly 14 includes a first body half 26*a*, a second body half 26*b* symmetrical to the first body half 26*a*, and a liner 30 arranged between the first body half 26*a* and the second body half 26*b*. The valve body assembly 14 defines a passageway 34 having an axis 38 along which process fluid can flow bi-directionally.

Figure 3:
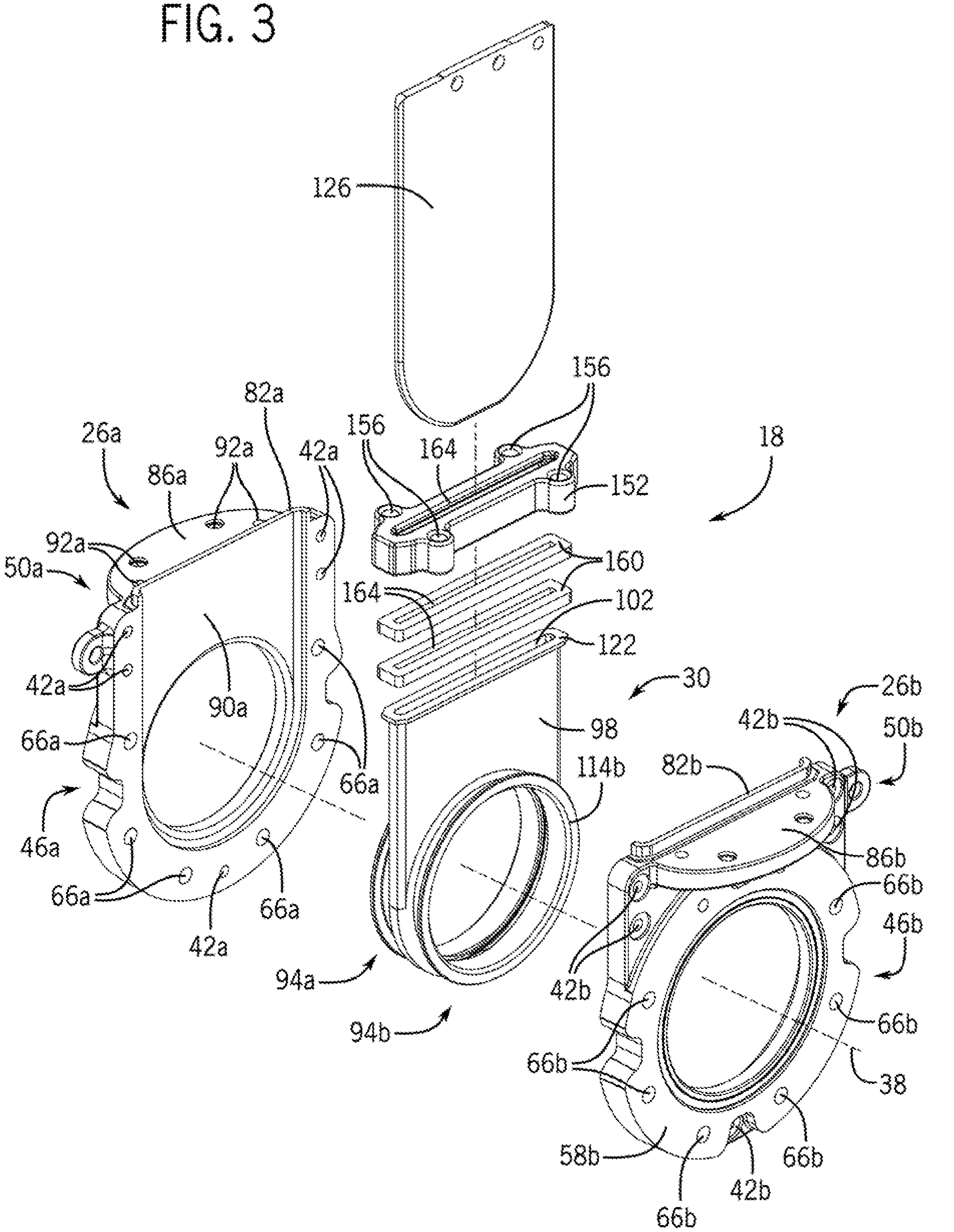
FIG. 3 is an exploded perspective view of a valve body assembly and a gate of the knife gate valve of FIG. 1.

The first and second body halves 26*a*, 26*b* are symmetric, and the following description of the first body half 26*a* also applies to the second body half 26*b*. The first body half 26*a* and the second body half 26*b* include similar features which are identified with like reference numerals and distinguished by the suffix "a" and "b" in the figures. As shown in FIG. 3, the first body half 26*a* includes a plurality of joining apertures 42*a*, a flange portion 46*a*, and a gland portion 50*a*. The plurality of joining apertures 42*a* are each arranged to align with a corresponding joining aperture 42*b* on the second body half 26*b*. The joining apertures 42*a*, 42*b* are each configured to receive a fastening element 54 (see FIG. 1) for joining the first body half 26*a* and the second body half 26*b*. In one embodiment, the fastening elements 54 are bolts secured by nuts. The first body half 26*a* and the second body half 26*b* are fabricated from a metal material, such as iron, stainless steel, or other ferrous or non-ferrous alloys.

Figure 4:
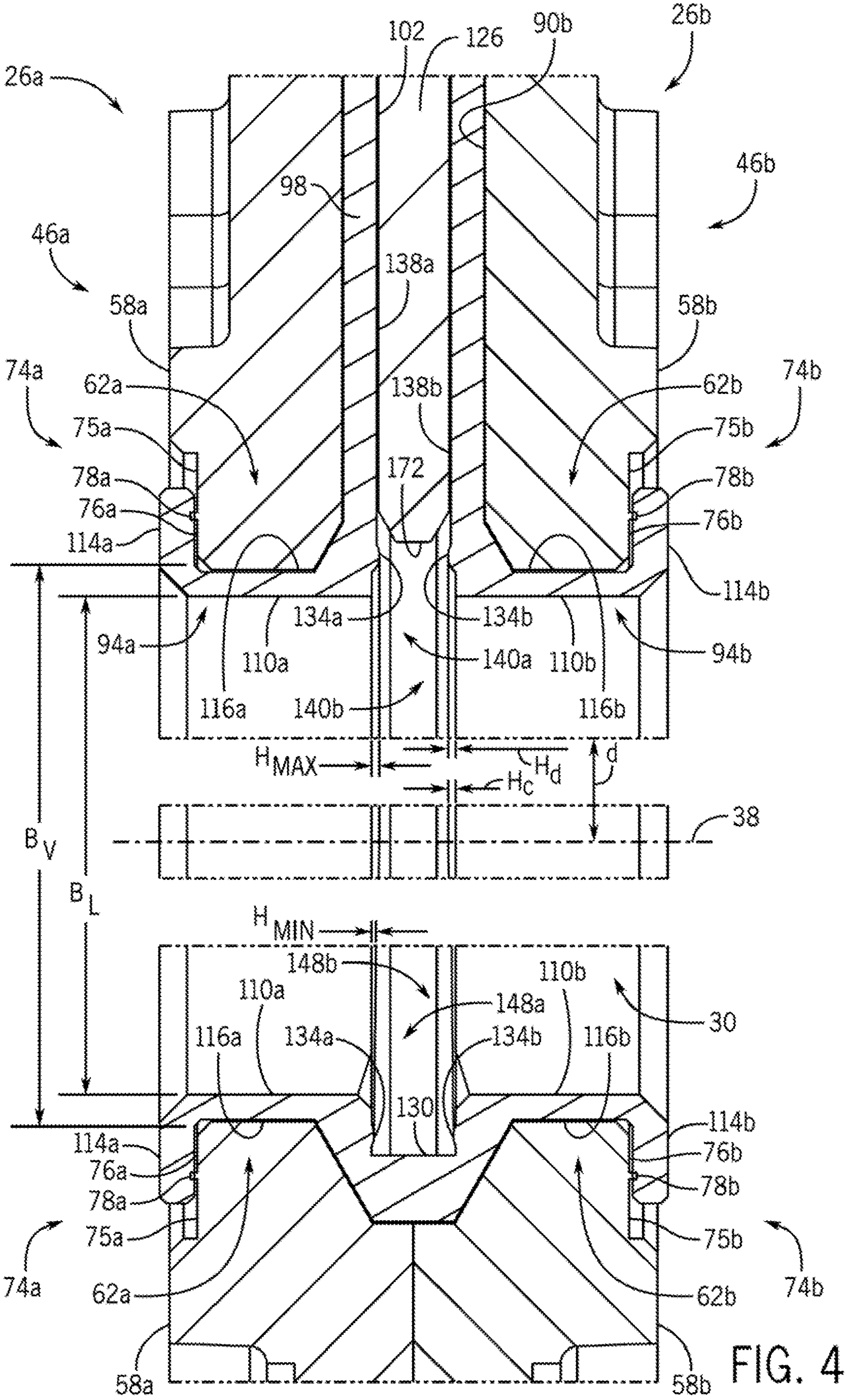
FIG. 4 is a cross-sectional view of the knife gate valve of FIG. 3 taken along line 4-4 with the gate in a first position.

As shown in FIG. 4, the flange portion 46*a* of the first body half 26*a* includes a flange surface 58*a* and a flange recessed portion 62*a* protruding radially inward towards axis 38 relative to the flange surface 58*a*. The flange surface 58*a* includes a plurality of flange apertures 66*a* (see FIG. 2) arranged radially around the flange surface 58*a*, which enables first body half 26*a* to couple to a pipe (not shown) through which the process fluid flows. The flange recessed portion 62*a* defines a valve bore $B_v$ and a flange recess surface 74*a* arranged substantially parallel to and recessed from the flange surface 58*a*. The flange recess surface 74*a* includes a first flange surface portion 75*a*, a second flange surface portion 76*a*, and a raised flange bead 78*a* arranged between the first flange surface portion 75*a* and the second flange surface portion 76*a* that protrudes from the flange recess surface 74*a*. The first flange surface portion 75*a* and the second flange surface portion 75*b* are coplanar and arranged substantially perpendicular to the axis 38. The raised flange bead 78*a* is arranged radially around the flange recess surface 74*a* and defines a substantially rectangular shape. In other embodiments, the raised flange bead 78*a* can define a substantially round shape, a substantially triangular shape, a substantially polygonal shape, or another suitable shape.

Figure 2:
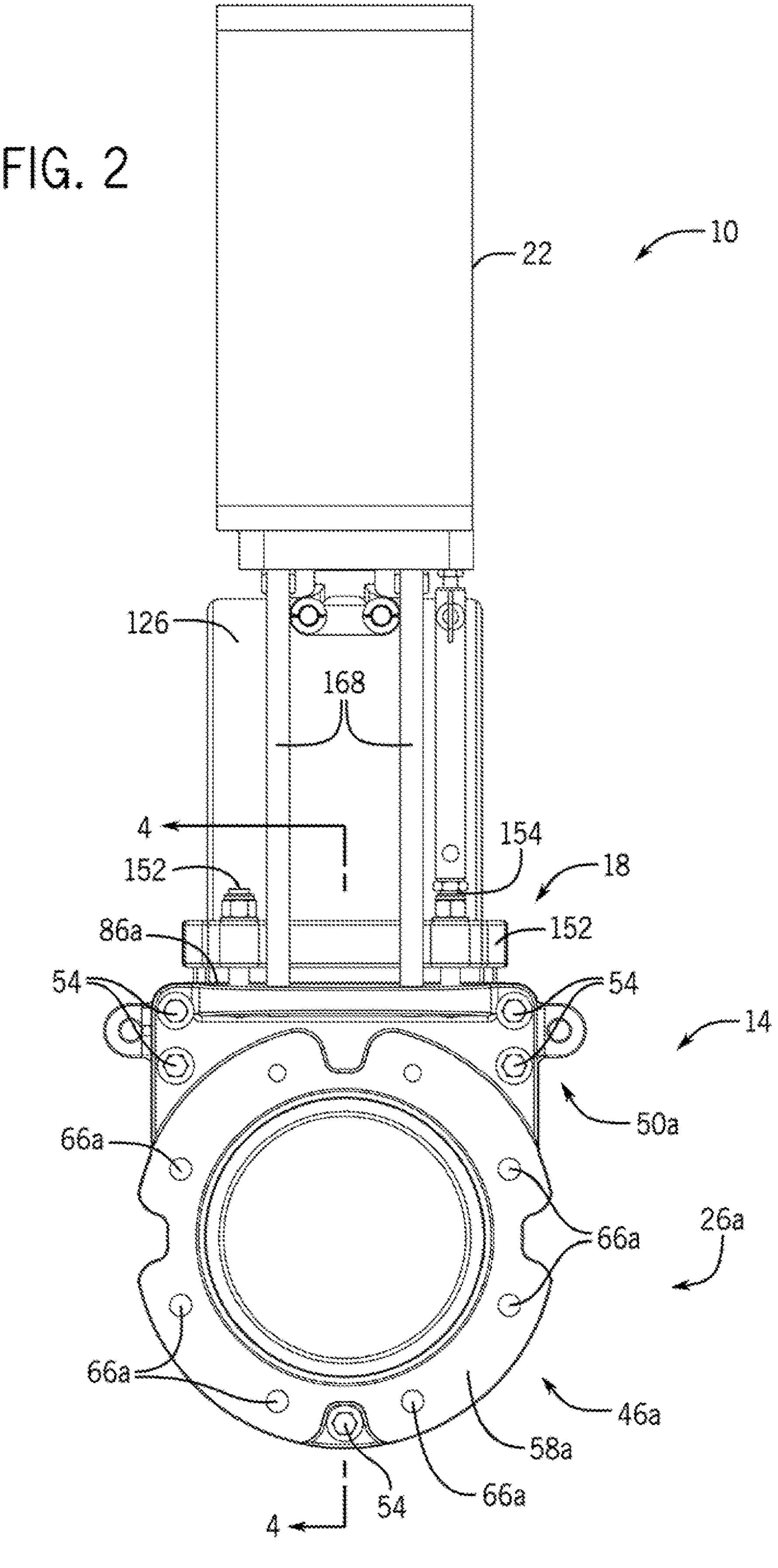
FIG. 2 is a front view of the knife gate valve of FIG. 1.

As shown in FIG. 3, the gland portion 50*a* of the first body half 26*a* includes a male gland follower 82*a* and a mounting surface 86*a* extending axially outward from the male gland follower 82*a*. The male gland follower 82*a* defines a conforming recess 90*a* which is configured to receive a portion of the liner 30. The mounting surface 86*a* includes a plurality of mounting apertures 92*a* for attaching the gland assembly 18 and the gate actuation mechanism 22 (as shown in FIGS. 1 and 2).

As also shown in FIG. 3, the liner 30 is a one-piece liner formed as a single piece of material and is configured to be received between the first body half 26*a* and the second body half 26*b*. In some embodiments, the liner 30 is fabricated from a polymeric material, such as polyurethane, that has a high resistance to abrasive and/or corrosive process flows. The liner 30 includes a first cylindrical portion 94*a*, a second cylindrical portion 94*b* symmetrical to the first cylindrical portion 94*a*, an upwardly extending chest portion 98, and a gate slot 102. Similar to the first body half 26*a* and the second body half 26*b*, the first cylindrical portion 94*a* and the second cylindrical portion 94*b* are symmetrical, and the following description of the first cylindrical portion 94*a* also applies to the second cylindrical portion 94*b*. Additionally, the first cylindrical portion 94*a* and the second cylindrical portion 94*b* include similar features which are identified with like reference numerals and distinguished by the suffix "a" and "b" in the figures.

As shown in FIG. 4, the first cylindrical portion 94*a* includes a liner bore surface 110*a* extending away from the gate slot 102 and a liner flange 114*a* extending substantially perpendicularly from the liner bore surface 110*a*. The liner bore surface 110*a* defines a liner bore BL. The liner bore surface 110*a* and the liner flange 114*a* combine to form a liner recess 116*a* which is configured to receive the flange recessed portion 62*a* of the first body half 26*a* and place the liner flange 114*a* into engagement with the flange recess surface 74*a*.

As shown in FIG. 4, the upwardly extending chest portion 98 extends from the first cylindrical portion 94*a* and the second cylindrical portion 94*b* to a liner top flange 122 (see FIG. 3). The chest portion 98 is configured to be received within the conforming recesses 90*a*, 90*b* and the liner top flange 122 is configured to engage the male gland followers 82*a*, 82*b*, as shown in FIG. 3.

As further shown in FIG. 4, the gate slot 102 slidably receives a gate 126 of the knife gate valve 10. The gate slot 102 extends through the liner 30 from the liner top flange 122 (see FIG. 3) to a gate recess 130 arranged at the bottom of the liner 30 between the first and second cylindrical portions 94*a*, 94*b* in a direction perpendicular to the axis 38. The illustrated gate slot 102 defines a substantially rectangular shape to conform to the geometry of the gate 126. In other embodiments, the gate slot 102 can define another shape to conform to another geometry of the gate 126 to provide bi-directional flow.

Figure 5:
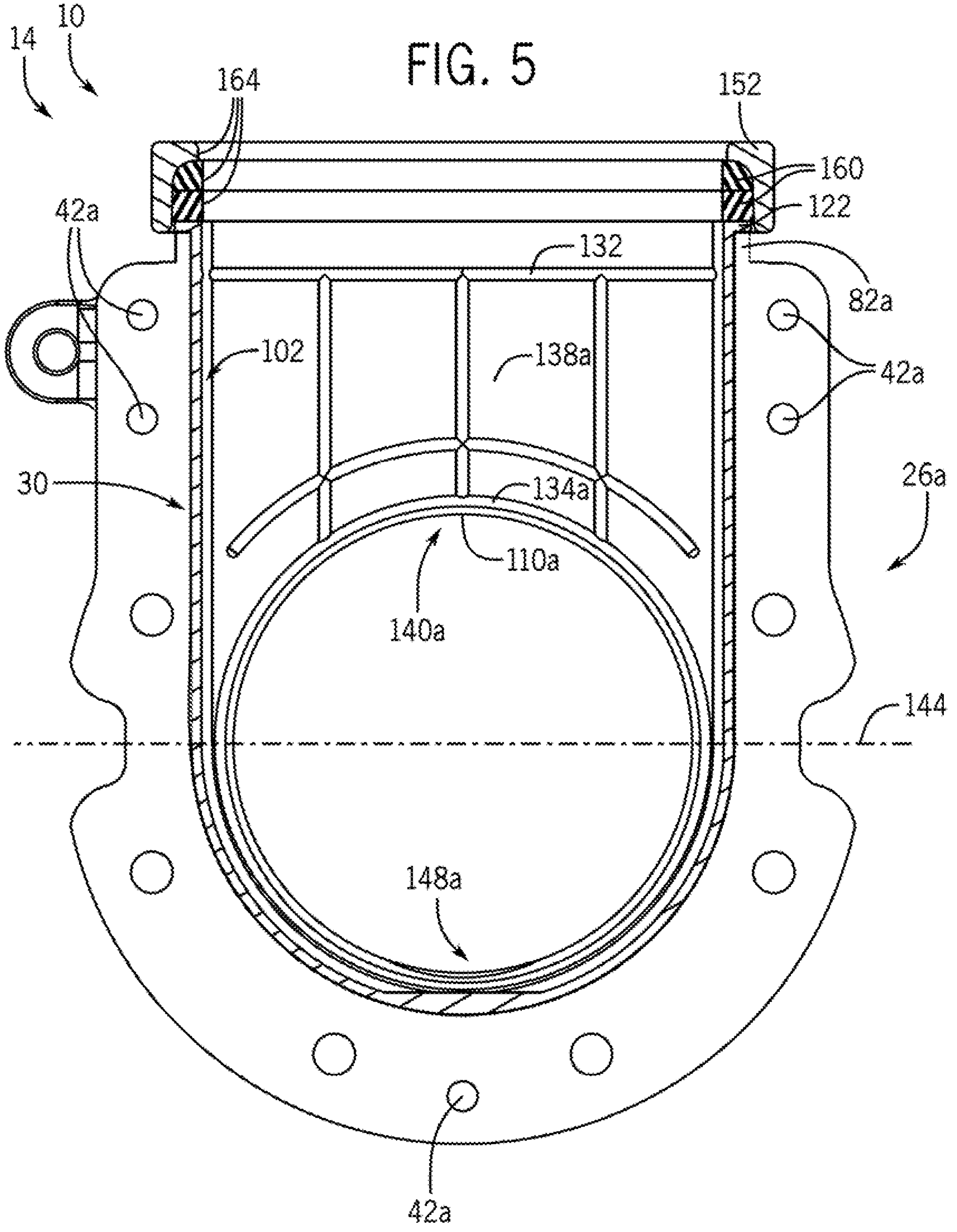
FIG. 5 is a cross-sectional view of the knife gate valve of FIG. 1 taken along line 5-5.

As shown in FIG. 5, the gate slot 102 includes a top sealing bead 132 arranged adjacent to the liner top flange 122, a first radial sealing bead 134*a* arranged adjacent to the liner bore surface 110*a* on a first longitudinal surface 138*a* of the gate slot 102, and a second radial sealing bead 134*b* (see FIG. 4) arranged adjacent to the liner bore surface 110*b* on a second longitudinal surface 138*b* of the gate slot 102. The first radial sealing bead 134*a* is symmetric to the second radial sealing bead 134*b*, and therefore, the following description of the first radial sealing bead 134*a* on the first longitudinal surface 138*a* also applies to the second radial sealing bead 134*b* on the second longitudinal surface 138*b*.

As shown in FIG. 4, first radial sealing bead 134*a* protrudes from and is arranged radially around the first longitudinal surface 138*a*. A distance that the first radial sealing bead 134*a* protrudes from the first longitudinal surface 138*a* is defined as a protrusion height. In one embodiment, the first radial sealing bead 134*a* defines a varying protrusion height that includes a maximum protrusion height $H_{max}$ at a top 140*a* of the first radial sealing bead 134*a*, a height $H_c$ at centerline 144 (see FIG. 5), and a minimum height $H_{min}$ at a bottom 148*a* of the first radial sealing bead 134*a*. The varying protrusion height of the first radial sealing bead 134*a* is described with reference to a percent decrease from $H_{max}$ defined by Equation 1 below:

$$\%\ DecreasefromH_{max} = \frac{H_{max} - H_d}{H_{max}} * 100 \quad (1)$$

where $H_d$ is the protrusion height at a distance d along the first radial sealing bead 134*a* from the top 140*a* to the bottom 148*a* of the first radial sealing bead 134*a*.

Figure 6:
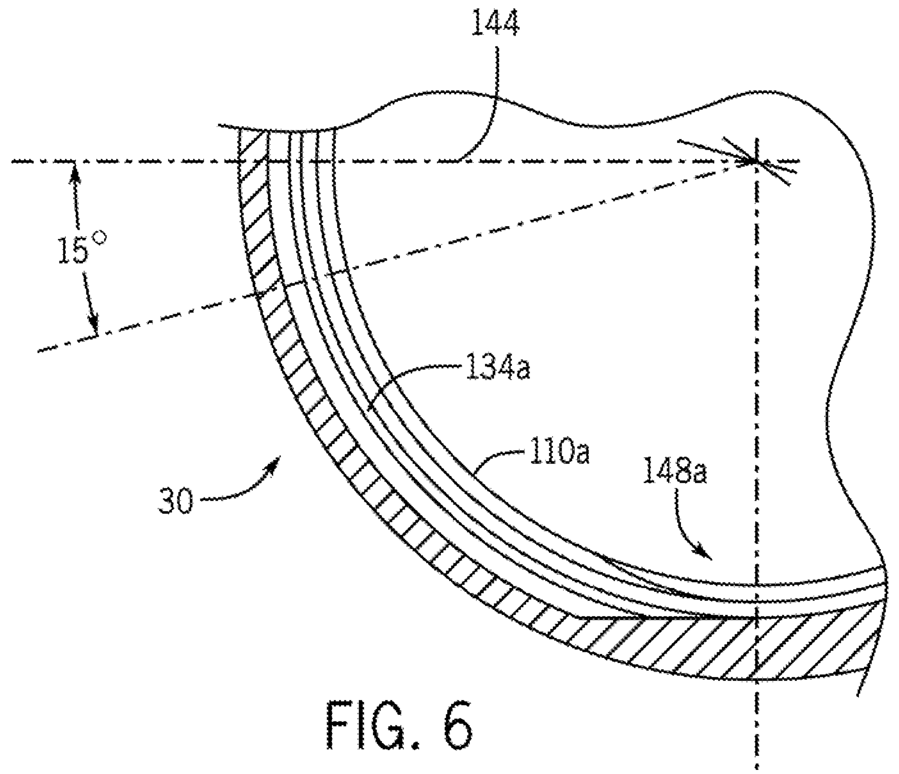
FIG. 6 is a front view of a portion of a liner of the knife gate valve of FIG. 1 according to one embodiment of the invention.
Figure 7:
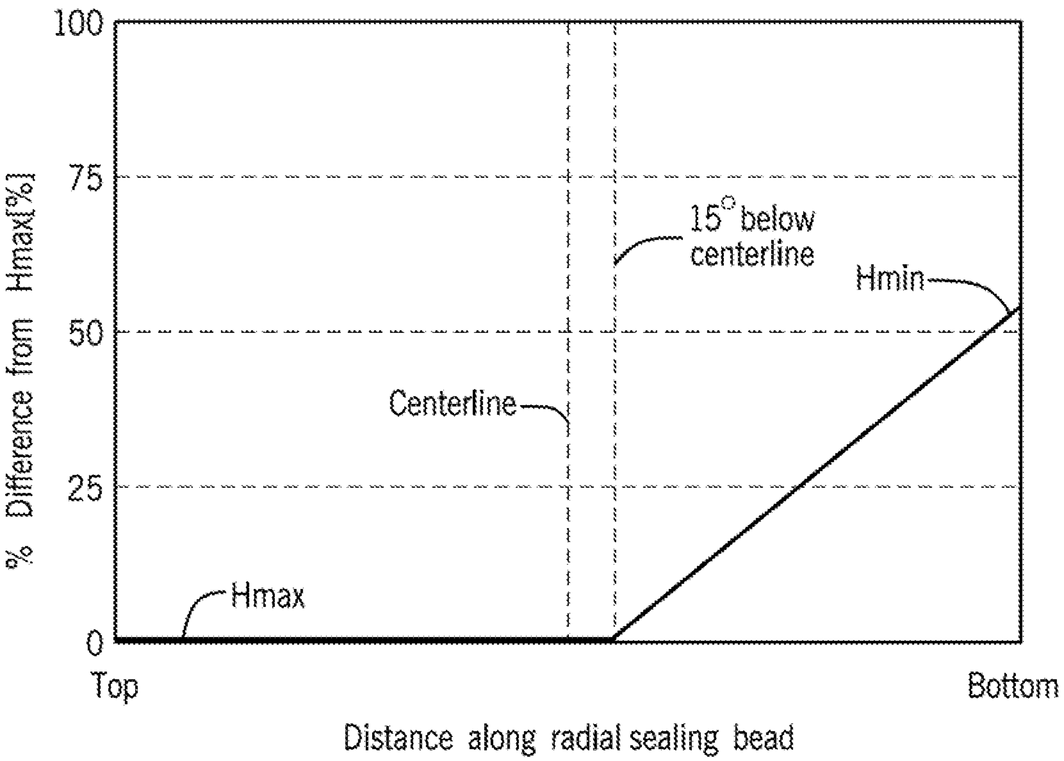
FIG. 7 is a graph illustrating a relationship between a percent decrease from a maximum protrusion height $H_{max}$ and distance along a first and second radial sealing bead of a liner of the knife gate valve of FIG. 1 according to one embodiment of the invention.

As shown in FIGS. 6 and 7, the protrusion height initially remains constant at $H_{max}$ and then begins to decrease at a location approximately fifteen degrees below the centerline 144. At the location approximately 15 degrees below the centerline 144, the protrusion height of the first radial sealing bead 134*a* starts to decrease substantially linearly to between approximately seventy-five percent and fifty percent from $H_{max}$. The protrusion height reaches $H_{min}$ at the bottom 148*a* of the first radial sealing bead 134*a*. In one embodiment, the minimum protrusion height $H_{min}$ has decreased approximately fifty-five percent from $H_{max}$.

Figure 8:
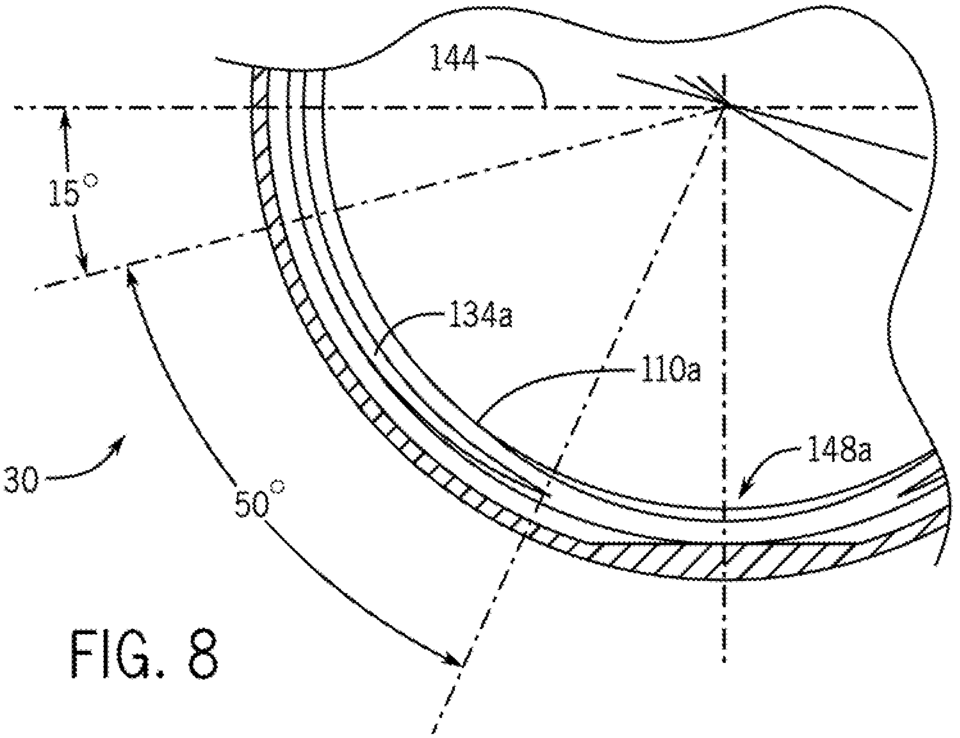
FIG. 8 is a front view of a portion of a liner of the knife gate valve of FIG. 1 according to another embodiment of the invention.
Figure 9:
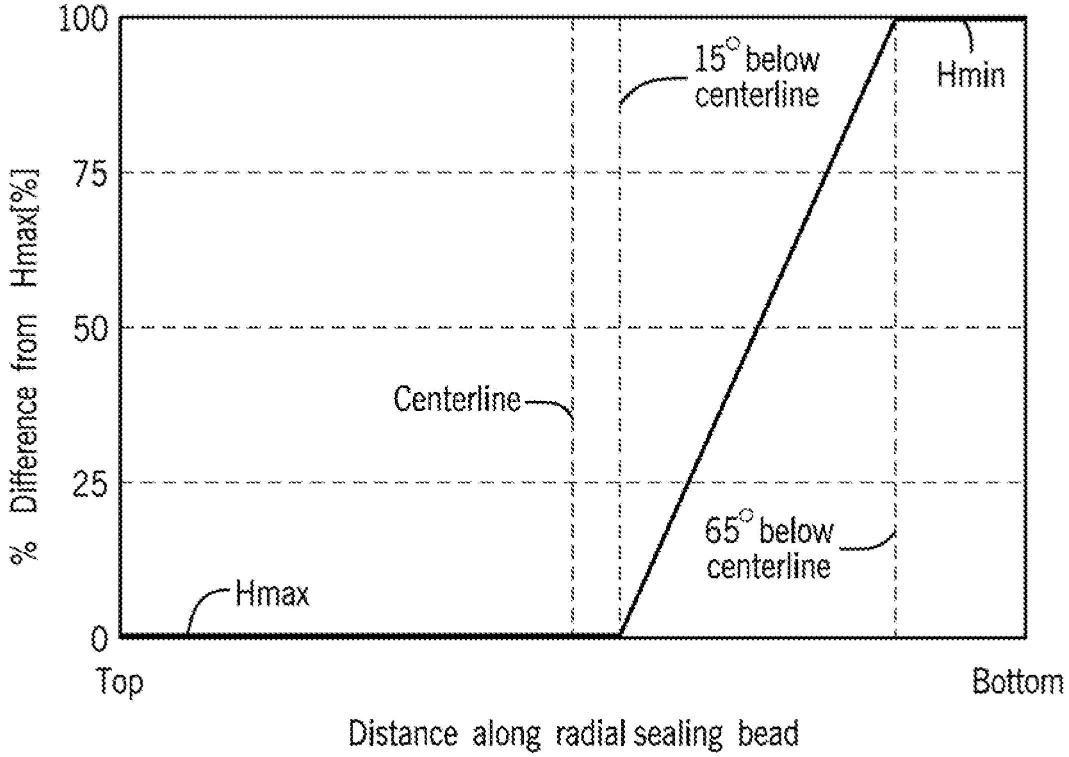
FIG. 9 is a graph illustrating a relationship between a percent decrease from a maximum protrusion height $H_{max}$ and distance along a first and second radial sealing bead of a liner of the knife gate valve of FIG. 1 according to another embodiment of the invention.

As shown in FIGS. 8 and 9, in another embodiment, the protrusion height initially remains constant at $H_{max}$ and then begins to decrease at a location approximately fifteen degrees below the centerline 144. The protrusion height decreases substantially linearly from $H_{max}$ at the location approximately 15 degrees below the centerline 144 to $H_{min}$ at a location approximately sixty-five degrees below the centerline 144. In one embodiment, the protrusion height of the first radial sealing bead 134*a* decreases between approximately seventy-five percent and one hundred percent from $H_{max}$. In another embodiment, the protrusion height of the first radial sealing bead 134*a* decreases approximately one hundred percent from $H_{max}$.

In some embodiments, the relationship between the percent decrease in the protrusion height from $H_{max}$ and the distance along the first radial sealing bead 134*a* can fall between the relationships shown in FIGS. 7 and 9. For example, the minimum protrusion height $H_{min}$ can be reached at a location between approximately sixty-five degrees below the centerline 144 and the bottom 148*a*, and decrease between approximately fifty percent and one hundred percent from $H_{max}$. In one embodiment, the protrusion height can decrease from $H_{max}$ starting above the centerline 144.

Although the profiles of the percent decrease in the protrusion height from $H_{max}$ as a function of the distance along the first radial sealing bead 134*a*, as shown in FIGS. 7 and 9, illustrate the protrusion height decreasing substantially linearly with distance, the protrusion height can alternatively define a step change or a non-linear relationship, as a function of distance along the first radial sealing bead 134*a*. Additionally, the profiles discussed above are only exemplary and other ranges and slopes/profiles of decreased bead height are contemplated. The invention generally provides a bead height that decreases in any manner between a top and a bottom of the first radial sealing bead 134*a*.

As shown in FIG. 3, the gland assembly 18 includes a gland box 152 attached to the mounting surfaces 86*a*, 86*b* of the first and second body halves 26*a*, 26*b* via fastening elements 154 (removed from FIG. 2 for clarity, see FIG. 1) inserted through gland mounting apertures 156 and into the mounting apertures 92*a*, 92*b*. The gland box 152 is configured to enclose one or more layers of packing 160 and compress the packing 160 against the liner top flange 122 which seals the liner top flange 122 between the male gland followers 82*a*, 82*b* and the packing 160. The gland box 152 and the packing 160 each include a gland slot 164 which is aligned with the gate slot 102 in the liner 30 and is configured to slidably receive the gate 126.

Figure 10:
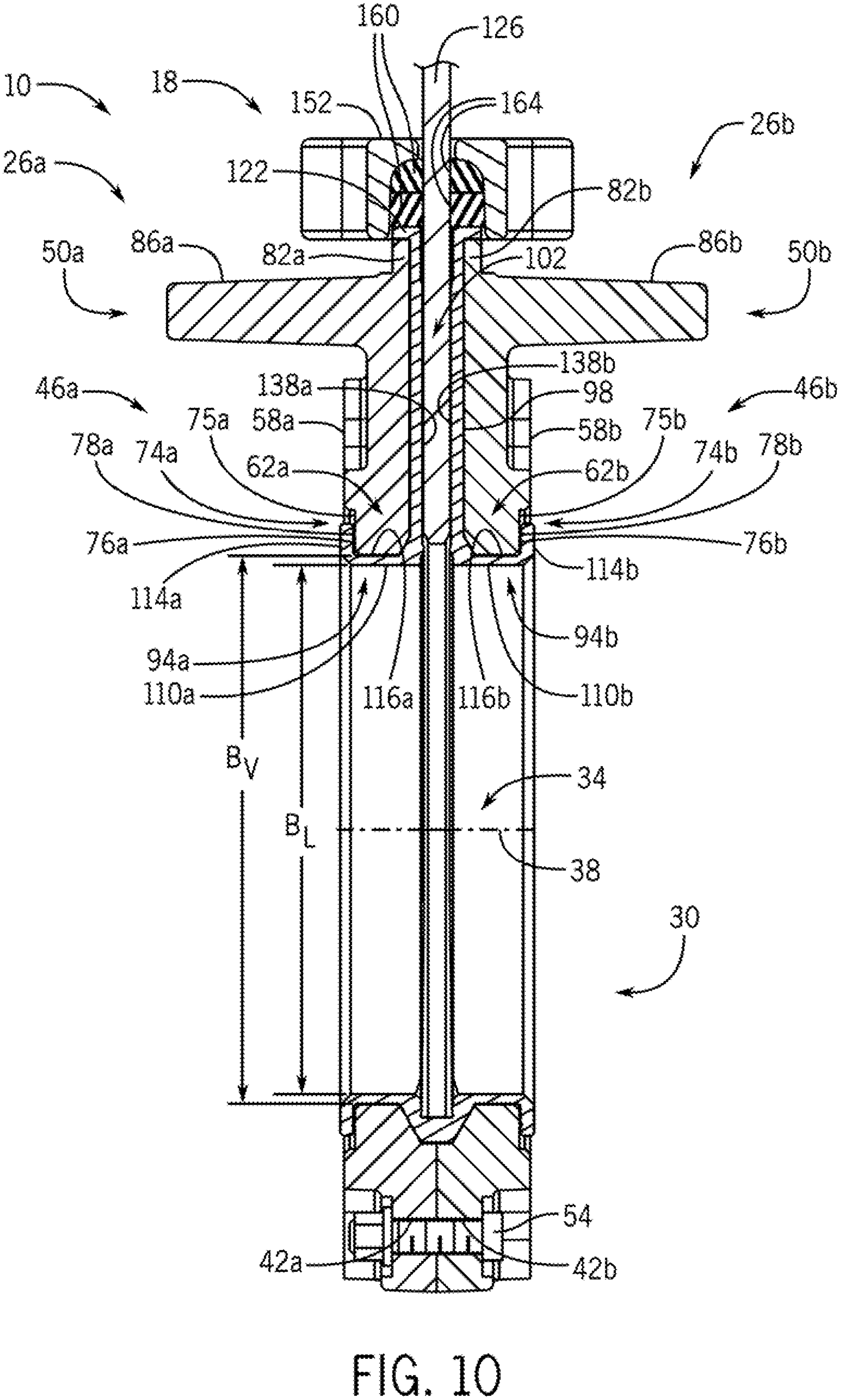
FIG. 10 is a cross-sectional view of the knife gate valve of FIG. 3 taken along line 4-4 with the gate in a first position.
Figure 11:
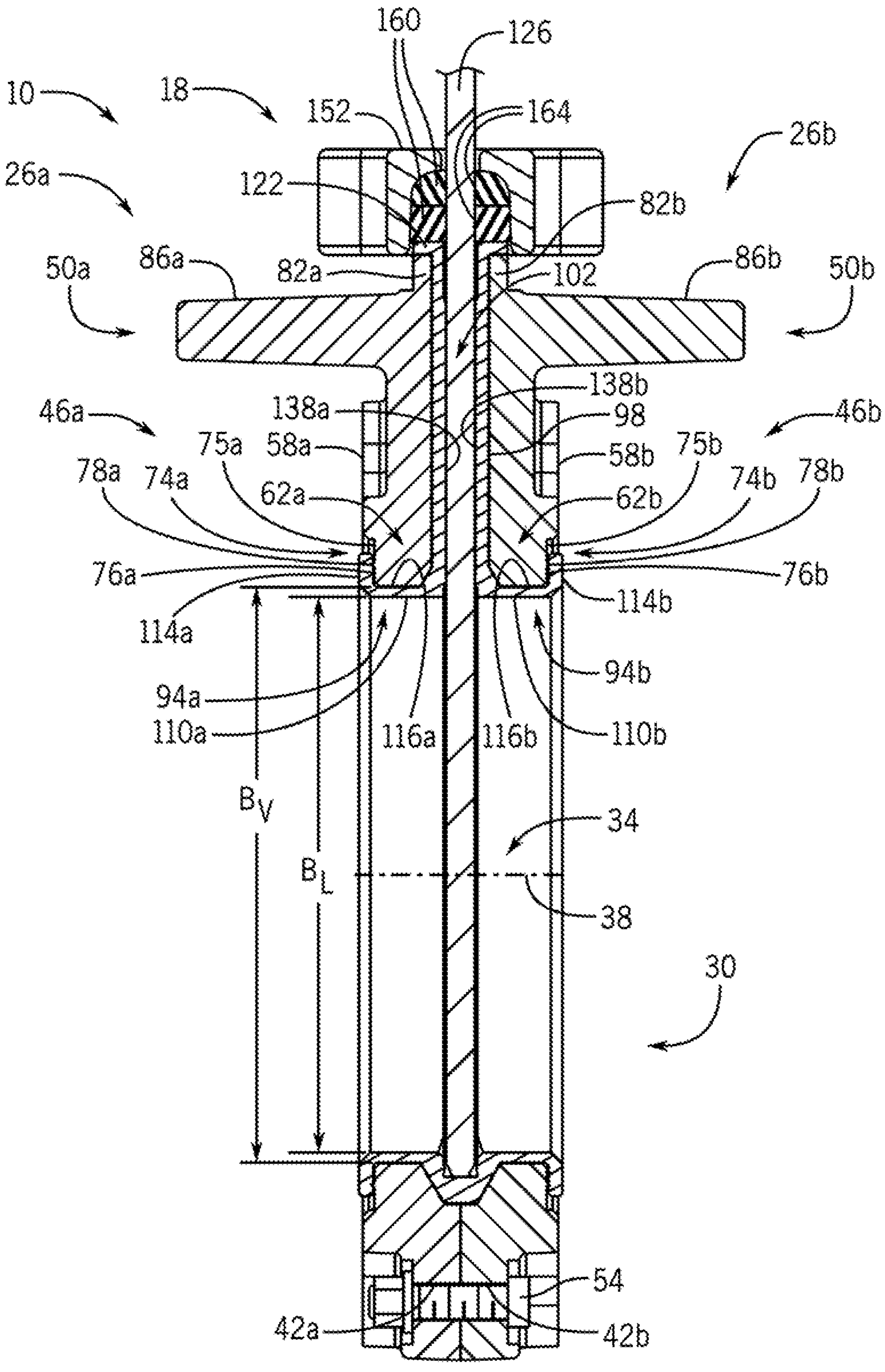
FIG. 11 is a cross-sectional view of the knife gate valve of FIG. 3 taken along line 4-4 with the gate in a second position.

As shown in FIG. 1, the gate actuation mechanism 22 is coupled to the gate 126 and attached to the mounting surfaces 86*a*, 86*b* of the first and second body halves 26*a*, 26*b*. The gate actuation mechanism 22 is configured to actuate the gate 126 between a first or open position (as shown in FIG. 10) where the gate 126 does not block any of the passageway 34 and process fluid is allowed to flow through the passageway 34 and a second or closed position (as shown in FIG. 11) where the gate 126 blocks the passageway 34 and process fluid is inhibited from flowing through the passageway 34. In some embodiments, the gate actuation mechanism 22 is an electronic actuator. In other embodiments, the gate actuation mechanism 22 can be a pneumatic actuator, a hand wheel and a threaded rod, or a lever.

Figure 12:
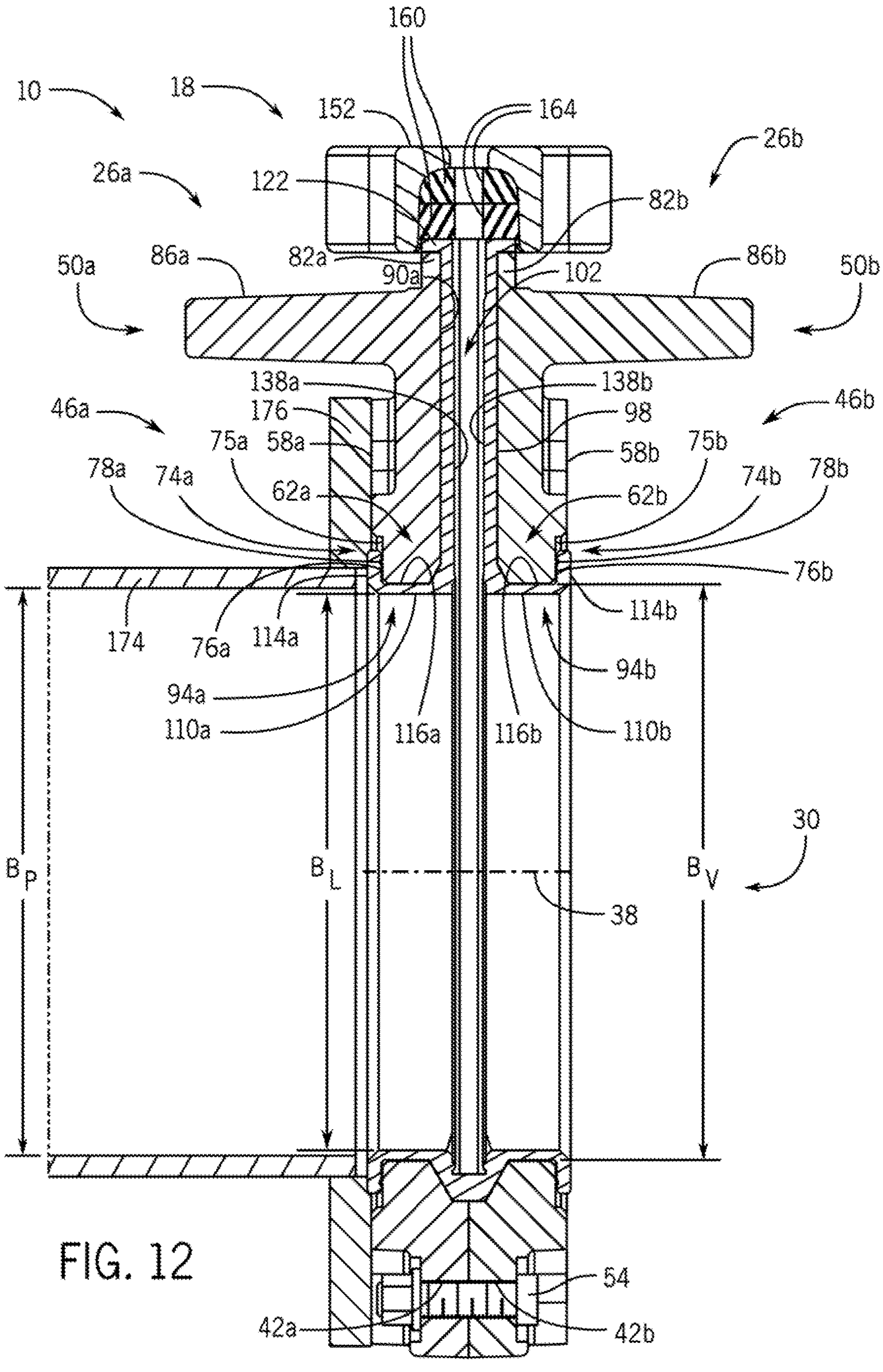
FIG. 12 is a cross-sectional view illustrating a pipe coupled to the knife gate valve of FIG. 1.

As shown in FIG. 12, the knife gate valve 10 is assembled by installing the liner 30 onto the first body half 26*a* by first manipulating the liner flange 114*a* through the smaller diameter of the valve bore $B_v$ defined by the flange recessed portion 62*a*. Once the liner flange 114*a* is manipulated through the flange recessed portion 62*a*, it is then expanded to position the flange recessed portion 62*a* within the liner recess 116*a* and place the liner flange 114*a* into engagement with the raised flange bead 78*a* on the flange recess surface 74*a*. With the flange recessed portion 62*a* positioned within the liner recess 116*a*, the chest portion 98 is also positioned within the conforming recess 90*a* and the liner top flange 122 is placed into engagement with the male gland follower 82*a*. In one embodiment, the liner 30 can be fabricated from polyurethane which provides the liner 30 with the flexibility to be manipulated through the valve bore $B_v$ and the rigidity to not permanently deform during the manipulation through the valve bore $B_v$.

A similar process is used to install the liner 30 onto the second body half 26*b*, as the second body half 26*b* and the second cylindrical portion 94*b* are symmetrical to the first body half 26*a* and the first cylindrical portion 94*a*, respectively. Once the liner 30 is installed onto both the first and second body halves 26*a*, 26*b*, the liner 30 is arranged between the first and second body halves 26*a*, 26*b* and the fastening elements 54 are installed through the joining apertures 42*a*, 42*b* and tightened to join the first body half 26*a* and the second body half 26*b*. This completes assembly of the valve body assembly 14 and the gland assembly 18 is then installed onto the valve body assembly 14 by first placing the packing 160 on the liner top flange 122 so that the gland slot 164 aligns with the gate slot 102. The gland box 152 is then installed over the packing 160 and the gate 126 is installed through the gland slot 164 and the gate slot 102. Once the gate 126 is installed, the fastening elements 154 are positioned, as shown in FIG. 1, then inserted though the gland mounting apertures 156 and into the corresponding mounting apertures 92*a*, 92*b* and then tightened to compress the packing 160 against the gate 126 and seal the liner top flange 122 between the packing 160 and the male gland followers 82*a*, 82*b*.

As shown in FIG. 1, the gate actuation mechanism 22 is then coupled to the gate 126 and attached to the first and second valve body halves 26*a* and 26*b* via rods 168 received within the corresponding mounting apertures 92*a*, 92*b*. The rods 168 provide enough clearance between the gate actuation mechanism 22 and the mounting surfaces 86*a*, 86*b* so that the gate 126 can actuate between the open position and the closed position.

As shown in FIG. 12, a pipe 174 is coupled to the first body half 26*a* using a pipe flange 176. The pipe flange 176 is fastened to the flange surface 58*a* via the plurality of flange apertures 66*a* (see FIG. 1). In some embodiments, the pipe flange 176 arrangement is a "slip on flange." The pipe flange 176 defines a pipe flange bore $B_p$ that is greater in diameter than the liner bore $B_L$. The liner flange 114*a* is not supported all the way to the liner bore $B_L$ by the pipe flange 176. In other words, due to the design of slip on flanges, a portion of the liner flange 114*a* is not in contact with the pipe flange 176. Typically, knife gate valves with replaceable liners are not able to seal properly with a slip on flange.

As also shown in FIG. 12, once the pipe flange 176 is fastened to the flange surface 58*a*, the pipe flange 176 compresses the liner flange 114*a* against the flange recess surface 74*a* and the raised flange bead 78*a*. The raised flange bead 78*a* provides a localized area of higher compression (e.g., a line contact seal) which prevents the liner flange 114*a* from moving and forms an integral seal between the liner flange 114*a* and the flange recess surface 74*a*. The pipe flange 176 compresses the liner flange 114*a* substantially perpendicularly against the first flange surface portion 75*a*, the second flange surface portion 76*a*, and the raised flange bead 78*a* of the flange recess surface 74*a*. As the first flange surface portion 75*a* and the second flange surface portion 76*a* are coplanar and arranged substantially perpendicular to the axis 38. This aids in inhibiting the liner flange 114*a* from creeping, or moving, under load from the pipe flange 176 or the process fluid. In addition to enabling the knife gate valve 10 to be operable with a slip on flange, the raised flange bead 78*a* eliminates the need for a separate gasket to be placed between the pipe flange 176 and the flange surface 58*a*.

Another pipe can be coupled to the second body half 26*b* using another pipe flange to allow process fluid to be carried after flowing through the passageway 34. Additionally, the second body half 26*b* and the second cylindrical portion 94*b* are symmetrical to the first body half 26*a* and the first cylindrical portion 94*a*, respectively. Therefore, the preceding description also applies to the second body half 26*b* and the second cylindrical portion 94*b* of the liner 30. Furthermore, the first body half 26*a* and the second body half 26*b* are capable of coupling to other, non-slip on pipe flanges that define a pipe bore $B_p$ that is less than or equal to the liner bore $B_v$.

As shown in FIG. 4, during operation, the process fluid imparts a differential pressure across the gate 126 of the knife gate valve 10 when the gate 126 is in the closed position. The differential pressure across the gate 126 causes the gate 126 to seal against either the first radial sealing bead 134*a* or the second radial sealing bead 134*b*, depending on the direction force provided by the differential pressure, preventing process fluid from leaking past or along the gate 126. As the differential pressure across the gate 126 increases, the gate 126 can deflect. For example, the gate 126 can engage the top 140*a* of the first radial sealing bead 134*a* and deflect to engage the bottom 148*b* of the second radial sealing bead 134*b*. Since the gate 126 is supported by the chest portion 98 of the liner 30, deflection of the gate 126 is typically at a maximum towards the bottom 148*a*, 148*b* of the first and second radial sealing beads 134*a*, 134*b*.

The first and second radial sealing beads 134*a*, 134*b* define a decreasing protrusion height from a maximum protrusion height $H_{max}$ at the top 140*a*, 140*b* of the first and second radial sealing beads 134*a*, 134*b* to a minimum protrusion height $H_{min}$ at the bottom 148*a*, 148*b* of the first and second radial sealing beads 134*a*, 134*b*. The varying height of the first and second radial sealing beads 134*a*, 134*b* enable the liner 30 to use the deflection of the gate 126 to increase sealing with increased differential pressure. This is achieved because the first and second radial sealing beads 134*a*, 134*b* define a maximum protrusion height $H_{max}$ where deflection of the gate 126 is at a minimum and define a minimum protrusion height $H_{min}$ where deflection of the gate 126 is at a maximum.

Simultaneously, the varying height of the first and second radial sealing beads 134*a*, 134*b* maintains a minimum valve closing force while deflection of the gate 126 increases with increased differential pressure. The valve closing force is the force necessary to move the gate 126 from the open position to the closed position. When the gate 126 is moving towards the closed position, and the differential pressure causes the gate 126 to deflect, a leading edge 172 of the gate 126 must overcome the protrusion height at the bottom 148*a*, 148*b* of the first radial sealing bead 134*a* or the second radial sealing bead 134*b*, depending on the direction of the deflection of the gate 126, to reach the closed position. The protrusion height at the bottom 148*a*, 148*b* of the first and second radial sealing beads 134*a*, 134*b* is the minimum protrusion height $H_{min}$ which minimizes the valve closing force and still provides an effective seal.

An integral seal is formed between the liner flanges 114*a*, 114*b* and the flange recess surfaces 74*a*, 74*b* and the liner top flange 122 is sealed between the packing 160 and the male gland followers 82*a*, 82*b*. These seals enable the liner 30 to completely isolate the valve body halves 26*a*, 26*b* from process fluid flowing through the passageway 34. This protects the valve body halves 26*a*, 26*b* from coming into contact with the process fluid which can be highly abrasive and/or corrosive, and enables the knife gate valve 10 to be reused while only requiring the liner 30 to be replaced as the process fluid begins to wear the liner 30 down.

The symmetry defined by the first and second body halves 26*a*, 26*b*, the first and second cylindrical portions 94*a*, 94*b*, and the first and second radial sealing beads 134*a*, 134*b* enables the knife gate valve 10 to achieve bi-directional sealing in either flow direction (i.e., from the first body half 26*a* towards the second body half 26*b* or from the second body half 26*b* towards the first body half 26*a*).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A housing assembly for a knife gate valve, the housing assembly comprising:

a valve body assembly defining a passageway having an axis and including a first body and a second body each having a flange recessed portion that extends toward the axis and defines a flange recess surface that is recessed axially relative to a flange surface;

each of the flange recess surfaces includes a first flange surface portion, a second flange surface portion, and a raised flange bead arranged between the first flange surface portion and the second flange surface portion, the first flange surface portion and the second flange surface portion being coplanar and extending in a direction that is transverse to the axis; and a one-piece liner arranged between the first body and the second body and including a first liner flanged portion that forms a first liner recess and a second liner flanged portion that forms a second liner recess;

the first liner recess receiving the flange recessed portion of the first body so that the first liner flanged portion extends around the flange recessed portion of the first body to bring the raised flange bead of the first body into engagement with the first liner flanged portion; and the second liner recess receiving the flange recessed portion of the second body so that the second liner flanged portion extends around the flange recessed portion of the second body to bring the raised flange bead of the second body into engagement with the second liner flanged portion.

2. The housing assembly of claim 1, wherein the one-piece liner defines a gate slot, the gate slot extending along a first gate surface in engagement with the first body and a second gate surface in engagement with the second body.

3. The housing assembly of claim 2, wherein the first liner flanged portion includes a first liner bore surface and a first liner flange, and the second liner flanged portion includes a second liner bore surface and a second liner flange.

4. The housing assembly of claim 3, wherein the first liner bore surface extends axially away from the first gate surface and the first liner flange extends radially away from the axis to define the first liner recess.

5. The housing assembly of claim 3, wherein a radial gap is formed between a distal end of the first liner flange and a radially-inner edge of the flange surface of the first body, and a radial gap is formed between a distal end of the second liner flange and a radially-inner edge of the flange surface of the second body.

6. The housing assembly of claim 3, wherein the raised flange bead of the first body engages the first liner flange to provide a first line contact seal, and the raised flange bead of the second body engages the second liner flange to provide a second line contact seal.

7. The housing assembly of claim 1, wherein the raised flange bead of the first body protrudes axially away from a plane defined along the first flange surface portion and the second flange surface portion of the first body, and the raised flange bead of the second body protrudes axially away from a plane defined along the first flange surface portion and the second flange surface portion of the second body.

8. The housing assembly of claim 7, wherein the raised flange bead of the first body secures a first liner flange of the first liner flanged portion to be disposed axially outside of the first body so that the first body is configured to be secured to a pipe flange at the flange surface of the first body without a separate gasket.

9. A housing assembly for a knife gate valve, the housing assembly comprising:

a valve body assembly defining a passageway having an axis and including a first body and a second body, each of the first body and the second body includes a flange surface and a flange recessed portion that protrudes radially inward relative to the flange surface;

each flange recess portion includes a first flange surface portion, a second flange surface portion, and a raised flange bead arranged between the first flange surface portion and the second flange surface portion; and a one-piece liner arranged between the first body and the second body and defining a gate slot, the one-piece liner including a first liner bore surface, a first liner flange, a second liner bore surface, and a second liner flange;

the gate slot extending along a first gate surface in engagement with the first body and a second gate surface in engagement with the second body;

the first liner bore surface extending axially away from the first gate surface and the first liner flange extending from the first liner bore surface radially away from the axis, opposite the first gate surface, to define a first liner recess that receives the flange recessed portion of the first body to bring the first liner flange into engagement with the raised flange bead of the first body; and the second liner bore surface extending axially away from the second gate surface and the second liner flange extending from the second liner bore surface radially away from the axis, opposite the second gate surface, to define a second liner recess that receives the flange recessed portion of the second body to bring the second liner flange into engagement with the raised flange bead of the second body.

10. The housing assembly of claim 9, wherein the first flange surface portion and the second flange surface portion are coplanar and extend in a direction that is transverse to the axis.

11. The housing assembly of claim 9, wherein the raised flange bead of the first body protrudes axially outward away from the first flange surface portion and the second flange surface portion of the first body, and the raised flange bead of the second body protrudes axially outward away from the first flange surface portion and the second flange surface portion of the second body.

12. The housing assembly of claim 9, wherein the raised flange bead of the first body engages the first liner flange to provide a first line contact seal, and the raised flange bead of the second body engages the second liner flange to provide a second line contact seal.

13. The housing assembly of claim 9, wherein a radial gap is formed between a distal end of the first liner flange and a radially-inner edge of the flange surface of the first body, and a radial gap is formed between a distal end of the second liner flange and a radially-inner edge of the flange surface of the second body.

14. A housing assembly for a knife gate valve, the housing assembly comprising:

a valve body assembly defining a passageway having an axis and including a first body and a second body each having a flange recessed portion that extends toward the axis and defines a flange recess surface that is recessed axially relative to a flange surface;

each flange recess surface includes a first flange surface portion, a second flange surface portion, and a raised flange bead arranged between the first flange surface portion and the second flange surface portion; and a one-piece liner arranged between the first body and the second body and including a first liner bore surface, a first liner flange, a second liner bore surface, and a second liner flange;

the first liner flange extending at least partially along and in engagement with the first flange surface portion, the raised flange bead, and the second flange surface portion of the first body, wherein a radial gap is formed between a distal end of the first liner flange and a radially-inner edge of the flange surface of the first body; and the second liner flange extending at least partially along and in engagement with the first flange surface portion, the raised flange bead, and the second flange surface portion of the second body, wherein a radial gap is formed between a distal end of the second liner flange and a radially-inner edge of the flange surface of the second body.

15. The housing assembly of claim 14, wherein the first flange surface portion and the second flange surface portion are coplanar and extend in a direction that is transverse to the axis.

16. The housing assembly of claim 14, wherein the raised flange bead of the first body protrudes axially away from a plane defined along the first flange surface portion and the second flange surface portion of the first body, and the raised flange bead of the second body protrudes axially away from a plane defined along the first flange surface portion and the second flange surface portion of the second body.

17. The housing assembly of claim 14, wherein the raised flange bead of the first body engages the first liner flange to provide a first line contact seal, and the raised flange bead of the second body engages the second liner flange to provide a second line contact seal.

18. The housing assembly of claim 14, wherein the one-piece liner defines a gate slot, the gate slot extending along a first gate surface in engagement with the first body and a second gate surface in engagement with the second body.

19. The housing assembly of claim 18, wherein the first liner bore surface extends axially away from the first gate surface, and the second liner bore surface extends axially away from the second gate surface.

20. The housing assembly of claim 14, wherein the first liner bore surface extends axially along the flange recessed portion of the first body, and the second liner bore surface extends axially along the flange recessed portion of the second body.

* * * * *